Nov. 28, 1950　　　R. G. NYE　　　2,531,458

DIRECT COUPLED BALANCED AMPLIFIER

Filed Feb. 17, 1949

INVENTOR.
R. GLEN NYE
BY
M. A. Hayes
ATTORNEY

Patented Nov. 28, 1950 2,531,458

UNITED STATES PATENT OFFICE 2,531,458

DIRECT COUPLED BALANCED AMPLIFIER

Robert Glen Nye, San Diego, Calif.

Application February 17, 1949, Serial No. 76,962

6 Claims. (Cl. 179—171)

(Granted under the act of March 3, 1883, as amended April 30, 1928; 370 O. G. 757)

This invention relates to amplifiers, and more particularly to a direct coupled, balanced amplifier which is simple in construction and stable in operation.

It is an object of this invention to provide a direct coupled amplifier exhibiting improved stability against drift due to shift in circuit parameters such as occurs in tubes and other elements as they heat up in operation.

It is another object of this invention to provide a direct coupled, balanced amplifier having simple means for controlling the gain of the signal without affecting the stabilizing character of the amplifier with respect to drift characteristics.

It is another object of this invention to provide a balanced amplifier in which two independent signals may be mixed in very simple manner, the output being proportional to the difference in magnitude between the two signals.

Other objects and many of the attendant advantages of this invention will be readily appreciated as the same becomes better understood by reference to the following description.

In accordance with the instant invention, a balanced amplifier is constructed having a first stage consisting of a pair of screen grid tubes having their cathodes connected together, their control grids being adapted to receive either a single balanced signal, or two independent signals. From the respective plates of the two screen grid tubes, direct coupling is provided to the respective grids of a pair of output tubes, the cathodes of which are connected together through a pair of cathode impedances, the midpoints of these impedances being returned to ground. Degenerative feedback is applied from the output tube cathodes to the two screen grids. This coupling preferably consists of a direct current connection which may or may not involve a series connected impedance.

In accordance with the instant invention, an impedance, such as an adjustable resistor, is connected between the two screen grids of the input tubes. This impedance has no effect whatever on the degenerative feedback insofar as drift stabilization is concerned, but it does directly affect the degeneration insofar as signal amplification is concerned. This impedance, which is preferably an adjustable resistor, thus constitutes a simple and convenient means for controlling the signal gain of the circuit without affecting its degenerative, self-stabilizing characteristics with respect to tube drift.

In order to cause the amplifier to respond in push-pull fashion, the common connection between the cathodes of the screen grid tubes is returned through a cathode impedance to the negative side of the plate voltage supply.

Output from the amplifier is taken in balanced fashion from the two plates of the second stage or output tubes, and is applied to a balanced load such as a pair of cathode-ray-deflecting coils.

The degenerative feedback concept of the instant invention, wherein a portion of the output from the cathode of the output tube is fed back thru direct coupling to the screen grid of the first tube, is not limited to a balanced amplifier, but may be applied to an unbalanced amplifier consisting of only a single input screen grid tube, and a single output tube having a cathode resistor connected between the cathode and ground.

In accordance with the general description immediately above, there will now be described a specific embodiment of the instant invention.

Figure 1:
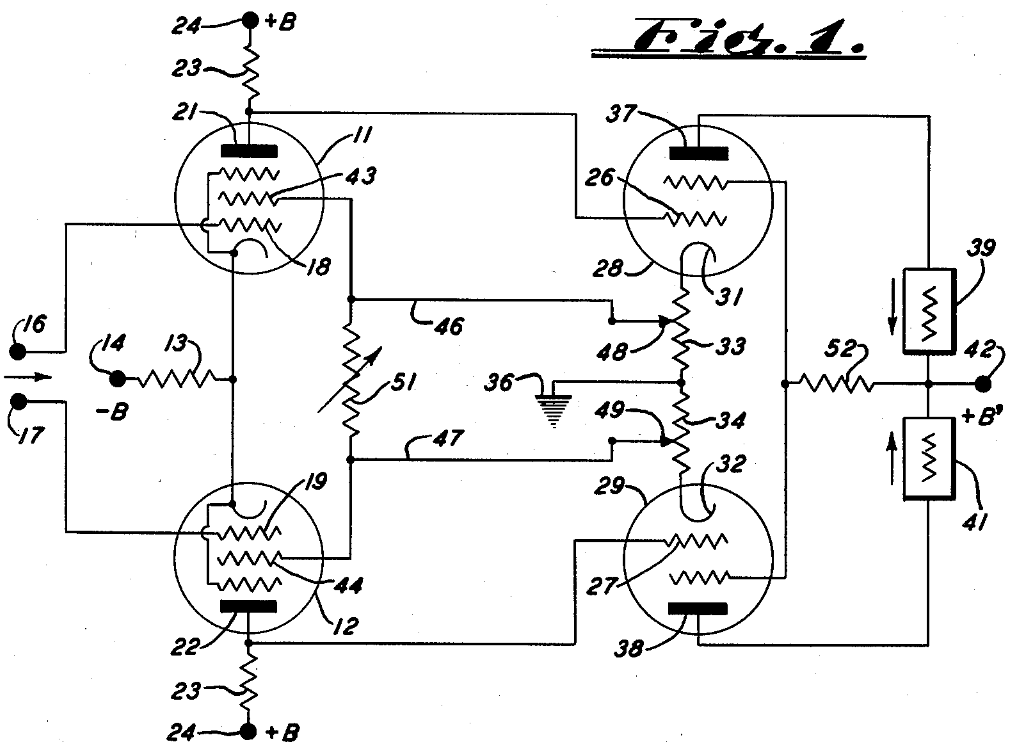
Fig. 1 is a circuit diagram of a preferred form of the instant invention.

Referring to Fig. 1, 11 and 12 designate a pair of screen grid tubes having their cathodes connected together, and, through a resistor 13, to the negative terminal 14 of a plate voltage supply. Input terminals 16 and 17 are connected to the control grids 18 and 19 of the tubes 11 and 12, respectively. The plates 21 and 22 of the respective tubes are connected thru suitable load resistors 23 to the positive terminals 24 of the above mentioned plate voltage supply. The plates 21 and 22 are direct coupled thru a direct current connection to control grids 26 and 27, respectively, of output tubes 28 and 29. The cathodes 31 and 32 of the tubes 28 and 29, respectively, are connected together thru series connected cathode resistors 33 and 34, the connection point between these resistors being returned to ground at 36. Output from the two tubes 28 and 29 is taken from their respective plates 37 and 38 and applied to balanced load impedances 39 and 41. The connection point between these impedances is applied to the positive side 42 of another source of plate voltage.

In accordance with the instant invention, degenerative feedback is applied from the two cathodes 31 and 32, to the respective screen grids 43 and 44 of the corresponding input tubes 11 and 12. This is done by means of direct current connections 46 and 47, which terminate in sliders 48 and 49, riding on the cathode resistors 33 and 34, respectively. The advantage of making the voltage fed back to the screen grids adjustable in this fashion is that the sliders 48 and 49 may be placed at such a position that the proper operating bias is applied to the screen grids 43 and 44.

The degenerative feedback thus effected thru the connections 46 and 47 may be made adjustable insofar as its effect on signal degeneration is concerned by connecting a variable resistor 51 between the two screen grids 43 and 44. The value of this resistor determines the degree of signal degeneration fed back to the grids 43 and 44, maximum signal degeneration being effected when resistor 51 is a maximum (i. e. open circuited), and minimum signal degeneration being effected when the resistor 51 is zero (i. e. short circuited). The degeneration which achieves stabilization in the amplifier is, however, independent of the magnitude of the resistor 51, as will be presently described.

The screen grids of the output tubes 28 and 29 are returned thru a resistor 52 to the terminal 42, connected to the positive side of the second plate supply.

Inasmuch as the balanced load impedances 39 and 41 are connected to receive all of the current passing thru the respective tubes 28 and 29, these tubes constitute essentially current output devices, which are particularly suited to feed high current devices as distinguished from high voltage devices. Such a high current output would be exemplified by the deflection coils of a cathode ray tube.

*Operation*

In order that a more clarified understanding of the instant invention may be obtained, certain aspects of the operation of the circuit of Fig. 1 will now be discussed.

The manner in which the degenerative feedback connections 46 and 47 achieve stabilization against inherent parameter changes, such as tube drifts due to temperature changes, will best be seen as follows. Assume that the signals on the terminals 16 and 17, respectively, remain unchanged, but that the characteristics of the tubes 11 and 12 shifts slightly, so that in spite of constant signal at 16 and 17, the voltages at the plates 21 and 22 increase. This applies increased voltages to the grids 26 and 27, causing increased currents thru the resistors 33 and 34, raising the voltages on the feedback conductors 46 and 47, and hence on the screen grids 43 and 44. The increased potentials on the screen grids tend to increase the conductivity of the tubes 11 and 12, thereby lowering the voltages on the plates 21 and 22, and tending to return the circuit to its previous condition. It is thus apparent that the degenerative feedback connections 46 and 47 serve to stabilize the amplifier against such changes due to parameter shifts. This stabilization is completely independent of the value of the adjustable resistor 51, operating exactly the same whether the resistor is open-circuited, short-circuited, or of some intermediate value.

Consider now the effect of the degenerative connections 46 and 47 upon a balanced input signal at the terminals 16 and 17, respectively. Assume further that the signal tends to increase, i. e. the voltage at 16 becomes more positive and that at 17 becomes more negative. This causes a drop in voltage at the plate 21, and an increase in voltage at the plate 22. The result is a drop in potential at the cathode 31, and a rise in potential at the cathode 32. The rise in potential at 31 is reflected thru the direct current connection 46 to the screen grid 43, where it tends to counteract the increased potential on the grid 18, thereby stabilizing the tube 11 by the degenerative feedback thus effected. The grid 43, however, has less effect on tube current than does the grid 18, so that there is still a net effective increase in output current thru the impedance 39. In a similar manner, increased potential on the grid 27 of tube 29 reflects an increased potential on the screen grid 44 of the tube 12, tending to offset the decreased potential on the input terminal 17.

The degenerative feedback thus described is—unlike that for tube drift—directly controlled by the magnitude of the resistor 51, as will be readily seen by considering two extreme conditions, namely, when the resistor 51 is infinite, i. e. open-circuited, and when it is zero, i. e. short-circuited. For the open-circuited case, the action of the circuit is substantially as described immediately above. If, however, the resistance 51 is reduced to zero value so that the two screen grids 43 and 44 are in effect tied together and must thus reside at the same potential, then the degenerative feedback upon the signals at the terminals 16 and 17 is reduced to zero or made ineffective. This is because of the fact that as one feedback connection 46 is trying to go positive, the other connection 47 is trying to go an equal amount negative, so that the two screen grids 43 and 44 remain fixed in potential, irrespective of change in the signals applied to the terminals 16 and 17.

The net effect is that a wide range volume control is made available in the form of the resistor 51, which, when it is set at zero magnitude, gives maximum gain of the amplifier, and when set at maximum magnitude, gives minimum gain.

The circuit illustrated in Fig. 1 will operate as a push-pull output device, even though only a single signal is applied to the input. Assume that the grid 19 is tied to ground and that a single signal is applied to the terminal 16. The action of the common cathode resistor 13 then causes the plates 21 and 22 of the input tubes to move up and down in potential in push-pull fashion as the signal is applied to the grid 16. That is to say, if the signal on the grid 18 goes positive, a corresponding negative signal appears on the plate 21. The increased voltage drop across the cathode resistor 13 is equivalent to a negative signal on the grid 19, so that a positive-going signal appears on the plate 22, in correspondence with the negative-going signal on the plate 21. There thus appears across the balanced load impedances 39 and 41, a balanced, or push-pull output signal in response to the single signal on the terminal 16.

From the above it will be apparent how the amplifier illustrated in Fig. 1 serves as a simple means for mixing two independent signals, one applied to the terminal 16, the other to the terminal 17. Assume that positive-going signals of equal magnitude are applied to the terminals 16 and 17. Any increase in current in the tube 11 appearing as an increased potential drop across the resistor 13 tends to lift the potential of the cathode of the tube 12, thereby offsetting the increasing potential at the terminal 17. Likewise, increased potential on the terminal 17 tends to offset increasing potential on the terminal 16 by virtue of the increased potential on the cathode of tube 11 resulting from the increased current thru the resistor 13. In this way, the balanced output current at the loads 39 and 41 becomes a function of the difference in voltages applied to the terminals 16 and 17.

An increased potential on the terminal 16 results in a corresponding decrease in current in the impedance 39 and increase in current in the impedance 41. In a similar manner, an increased potential on the terminal 17 results in a corresponding decrease in current thru the impedance 41, and increase in current thru the impedance 39. The total effect is the algebraic sum of the two, i. e. a push-pull output thru the balanced load 39—41 which is a function of the difference in potentials at the terminals 16 and 17.

*Modification*

Figure 2:
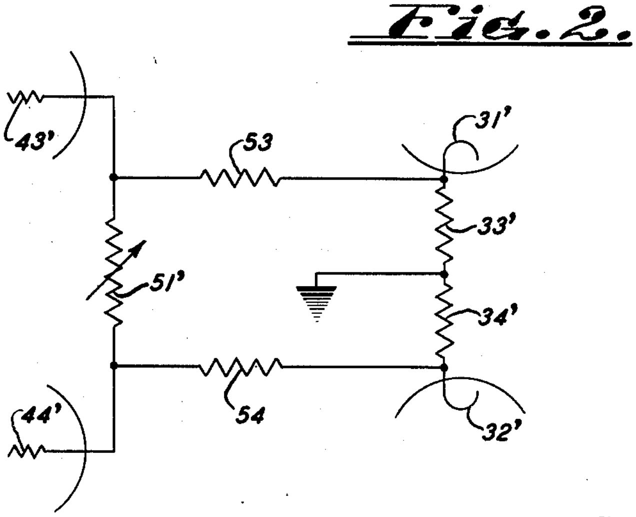
Fig. 2 is a fragmentary diagram showing how a portion of the circuit of Fig. 1 may be modified if desired.

Instead of tapping the feedback connections 48 and 49 to the cathode impedances 33 and 34, they may be tied directly to the cathodes, as shown in Fig. 2, wherein primed numerals indicate parts corresponding to those in Fig. 1. In this event, it is preferred to insert protective resistors 53 and 54 between the cathodes 31' and 32' in order to protect the gain control resistor 51' from the high current which would flow when it is set at low magnitude. In the Fig. 2 modification, it is necessary to adjust other parameters to insure that the operating potential of the screen grids 43' and 44' will be at proper level.

*Parameters*

A satisfactory amplifier has been constructed in accordance with the instant invention, employing the following parameters:

Tubes 11 and 12—6SJ7
Tubes 28 and 29—6L6
Resistor 13—18 kilohms
Resistors 23—270 kilohms
Adjustable resistor 51—15 kilohms
B—supply voltage plus 210 volts
B—150 volts
+B'—+400 volts From the above description, it will be seen that there has been described a balanced, push-pull amplifier which is stabilized by degenerative feedback against shift due to drifting of tube parameters, and which is nonetheless readily controlled with respect to the gain of a signal applied to the amplifier.

Obviously many modifications and variations of the present invention are possible in the light of the above teachings. It is, therefore, to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A balanced amplifier comprising a pair of screen grid tubes having their cathodes connected together, a resistance connected to the junction point of said cathodes, means for applying signals to the control grids of said screen grid tubes, a pair of output tubes having their cathodes connected together thru a pair of series connected resistances, the anodes of said screen grid tubes being connected to the respective grids of said output tubes, direct current feedback connections between the cathodes of said output tubes and the respective screen grids of said screen grid tubes, an adjustable resistance connected between the screen grids of said pair of screen grid tubes, and a pair of balanced load impedances connected in series and to the respective anodes of said output tubes.

2. A balanced amplifier comprising a pair of screen grid tubes having their cathodes connected together, a pair of output tubes having their cathodes connected together thru a pair of series-connected impedances, the anodes of said screen grid tubes being connected to the respective grids of said output tubes, direct current feedback connections between the cathodes of said output tubes and the respective screen grids of said screen grid tubes, and an adjustable impedance connected between the screen grids of said pair of screen grid tubes.

3. A balanced amplifier comprising a pair of screen grid tubes having their cathodes connected together, a pair of output tubes having their cathodes connected together thru impedance means, the anodes of said screen grid tubes being connected to the respective grids of said output tubes, direct current feedback connections between the cathodes of said output tubes and the respective screen grids of said screen grid tubes, and an adjustable impedance connected between the screen grids of said pair of screen grid tubes.

4. A balanced amplifier comprising a pair of screen grid tubes having their cathodes connected together, an impedance connected to the junction point of said cathodes, a pair of output tubes having their cathodes connected together thru impedance means, a pair of circuit means connecting the anodes of said screen grid tubes to the respective grids of said output tubes, another pair of circuit means connecting the cathodes of said output tubes to the respective screen grids of said screen grid tubes, and an adjustable impedance connected between the screen grids of said pair of screen grid tubes.

5. A balanced amplifier comprising a pair of screen grid tubes having their cathodes connected together, a pair of output tubes having their cathodes connected together thru impedance means, a pair of circuit means connecting the anodes of said screen grid tubes to the respective grids of said output tubes, another pair of circuit means connecting the cathodes of said output tubes to the respective screen grids of said screen grid tubes, and an adjustable impedance connected between the screen grids of said pair of screen grid tubes.

6. A balanced amplifier comprising a pair of screen grid tubes having their cathodes connected together, a pair of output tubes having their cathodes connected together thru impedance means, a pair of circuit means connecting the anodes of said screen grid tubes to the respective grids of said output tubes, and another pair of circuit means connecting the cathodes of said output tubes to the respective screen grids of said screen grid tubes.

R. GLEN NYE.

REFERENCES CITED

The following references are of record in the file of this patent:

UNITED STATES PATENTS

| Number | Name | Date |
|---|---|---|
| 1,926,749 | Mages | Sept. 12, 1933 |
| 1,986,597 | Nyman | Jan. 1, 1935 |
| 2,085,488 | Woodward et al. | June 29, 1937 |